US008801295B2

(12) United States Patent
Ueno

(10) Patent No.: US 8,801,295 B2
(45) Date of Patent: Aug. 12, 2014

(54) RETAINER FOR TAPERED ROLLER BEARING, METHOD FOR MANUFACTURING RETAINER, AND TAPERED ROLLER BEARING

(75) Inventor: Takashi Ueno, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 13/583,978

(22) PCT Filed: Mar. 23, 2011

(86) PCT No.: PCT/JP2011/056895
§ 371 (c)(1),
(2), (4) Date: Sep. 11, 2012

(87) PCT Pub. No.: WO2011/129178
PCT Pub. Date: Oct. 20, 2011

(65) Prior Publication Data
US 2013/0004113 A1 Jan. 3, 2013

(30) Foreign Application Priority Data

Apr. 15, 2010 (JP) ................................ 2010-093977

(51) Int. Cl.
*F16C 33/56* (2006.01)
(52) U.S. Cl.
USPC ........................................................ 384/576
(58) Field of Classification Search
CPC ............... F16C 33/4635; F16C 19/364; F16C 33/4605; F16C 33/4676; F16C 2208/52
USPC ................................................. 384/572, 576
See application file for complete search history.

(56) References Cited

U.S. PATENT DOCUMENTS 4,523,862 A * 6/1985 Yasui et al. .................... 384/564
8,167,503 B2 * 5/2012 Ueno ............................. 384/576
(Continued)

FOREIGN PATENT DOCUMENTS

JP 52-80343 6/1977
JP 58-165324 11/1983
(Continued)

OTHER PUBLICATIONS

International Search Report issued Jun. 21, 2011 in International (PCT) Application No. PCT/JP2011/056895.
(Continued)

*Primary Examiner* — James Pilkington
(74) *Attorney, Agent, or Firm* — Wenderoth, Lind & Ponack, LLP.

(57) ABSTRACT

A retainer for a tapered roller includes a first side having a first radius and a second side having a second radius, wherein the first radius is smaller than the second radius, a first ring portion at the first side of the retainer, a second ring portion at the second side of the retainer, and a plurality of brace portions arranged between the first ring portion and the second ring portion. The retainer is made of a resin material and is configured to retain tapered rollers in pockets formed between the brace portions. A hook portion is formed at the second side of the retainer, and is engaged with an inner race on a second side having a larger radius than a first side thereof. An outer diameter of each pocket on the first side of the retainer is larger than an inner diameter of the hook portion.

6 Claims, 11 Drawing Sheets

(56) References Cited

U.S. PATENT DOCUMENTS

| | | | | |
|---|---|---|---|---|
| 8,596,877 | B2* | 12/2013 | Kanbori et al. | ............... 384/571 |
| 2010/0074569 | A1* | 3/2010 | Matsushita | ................... 384/571 |
| 2010/0209036 | A1 | 8/2010 | Ueno | |
| 2010/0322548 | A1 | 12/2010 | Kanbori et al. | |

FOREIGN PATENT DOCUMENTS

| | | |
|---|---|---|
| JP | 2002-5176 | 1/2002 |
| JP | 2002-054638 | 2/2002 |
| JP | 2005-201457 | 7/2005 |
| JP | 2005-351472 | 12/2005 |
| JP | 2008-121744 | 5/2008 |
| JP | 2009-36327 | 2/2009 |
| JP | 2009-204063 | 9/2009 |
| WO | WO2008/149854 | * 12/2008 |

OTHER PUBLICATIONS

International Preliminary Report on Patentability and Written Opinion of the International Searching Authority issued Nov. 15, 2012 in International (PCT) Application No. PCT/JP2011/056895.

* cited by examiner

RETAINER FOR TAPERED ROLLER BEARING, METHOD FOR MANUFACTURING RETAINER, AND TAPERED ROLLER BEARING

BACKGROUND OF THE INVENTION

1. Field of the Invention

The present invention relates to a retainer for a tapered roller bearing, a method of manufacturing a retainer, and a tapered roller bearing.

2. Description of the Related Art

Driving force of an automobile engine is transmitted to wheels through an intermediation of a power transmission system including any one or all of a transmission, a propeller shaft, a differential, and a drive shaft.

In the power transmission system, there is used in many cases, as a bearing for supporting a shaft, a tapered roller bearing excellent in load capacity with respect to radial load, and in impact resistance. As illustrated in FIG. 12, the tapered roller bearing generally includes an inner race 2 having a tapered raceway surface 1 on an outer peripheral side thereof, an outer race 4 having a tapered raceway surface 3 on an inner peripheral side thereof, a plurality of tapered rollers 5 arranged so as to be rollable between the inner race 2 and the outer race 4, and a retainer 6 for retaining the tapered rollers 5 at predetermined circumferential intervals.

The retainer 6 includes a radially-larger-side ring portion 6a, a radially-smaller-side ring portion 6b, and brace portions 6c for coupling the ring portions 6a and 6b to each other. The tapered rollers 5 are accommodated in pockets 6d formed between the brace portions 6c adjacent to each other in a circumferential direction.

In the tapered roller bearing, the tapered rollers 5 and the respective raceway surfaces 1 and 3 of the inner race 2 and the outer race 4 are held in linear contact with each other, and the tapered roller bearing is designed such that the respective raceway surfaces 1 and 3 of the inner and outer races and a roller center O accord with one point (not shown) on an axial center P.

Thus, the tapered rollers 5 are pressed to a larger end side when load acts thereon. In order to bear the load, a flange portion 7 protruding to a radially outer side is provided on a radially larger side of the inner race 2. Further, in order to prevent the tapered rollers 5 from falling to a smaller end side until completion of the incorporation of the bearing into a machine or the like, there is provided a flange portion 8 protruding also to the smaller end side of the inner race 2.

Under the above-mentioned circumstances, there has been proposed to achieve longer life of the bearing by increasing the number of the rollers or by increasing the length of the rollers so as to increase load capacity within the same dimension as compared to the currently-used bearing. However, in the currently-used structure, as described above, in terms of assembly of the bearing, the flange portion (small flange) 8 is provided on the radially smaller side of the raceway surface of the inner race. Therefore, the flange portion 8 imposes restriction on an increase in the length dimension of the tapered rollers 5. Further, the tapered rollers 5 are retained by the retainer 6 as described above, and the brace portions 6c of the retainer 6 are interposed between the tapered rollers 5 adjacent to each other in the circumferential direction. Thus, the brace portions 6c impose restriction also on the rollers to be increased in number. As described above, there has been conventionally a limitation on an increase in the load capacity.

In view of the above, in some conventional tapered roller bearings, a flange portion (small flange) on a radially smaller side is omitted in an inner race (Japanese Utility Model Application Publication No. 58-165324). When the flange portion on the radially smaller side is omitted in the inner race, it is possible to secure a larger axial length of the tapered rollers correspondingly to a size of the flange portion thus omitted, and hence possible to achieve an increase in the load capacity.

Further, as a conventional technology for increasing load capacity of a tapered roller bearing, there is known a method of narrowing each gap between rollers to set the number of rollers equal to the number of rollers of a full complement roller bearing (Japanese Patent Application Publication No. 2005-351472).

However, when the flange portion (small flange) on the radially smaller side is omitted, the tapered rollers 5 fall to the smaller end side before completion of the incorporation into a machine or the like. That is, an assembly including the inner race, the rollers, and the retainer cannot be formed. As a countermeasure, in Japanese Patent Application Publication No. 2008-121744, on the radially larger side of the retainer, there are provided hook portions to be engaged with the radially larger side of the inner race.

That is, an assembly including the inner race, the rollers, and the retainer is formed through providing such structure that the hook portions are provided on the radially larger side of the retainer, and a circumferential groove into which the hook portions are hooked is formed in a radially outer surface of the inner race on a radially larger side thereof. Further, the bearing having the above-mentioned structure is not different from a conventional tapered roller bearing (tapered roller bearing including no hook portions) in handling the bearing. Still further, through setting a full complement roller bearing condition in the bearing provided with the above-mentioned hook portions, it is possible to increase the number of rollers, and to increase the load capacity.

Description is made of a method of manufacturing a retainer including no hook portions. In this case, the retainer is formed using two dies combined with each other in an axial direction. As illustrated in FIGS. 13A and 13B, the retainer is formed using a mold device which includes a first die (upper die) 11 arranged on the radially outer side and a second die (lower die) 12 arranged on the radially inner side. That is, as illustrated in FIG. 13A, the first die 11 is placed on top of the second die 12, and a resin is filled into a cavity 13 formed by the first die 11 and the second die 12, and then is pressurized. In this manner, the retainer is formed.

After the retainer is formed, separation work is performed on the mold device. In this case, first, as illustrated in FIG. 13B, the first die 11 is moved away from the second die 12 while being slid toward an axial center in an arrow "A" direction. In this manner, the first die 11 is separated from the retainer 6, and the retainer 6 adheres to the second die 12. After that, the retainer 6 is pushed out to the radially smaller side from the radially larger side, and accordingly the retainer 6 is removed from the second die 12.

However, as illustrated in FIG. 9, in a case where hook portions 15 are provided in the retainer 6, the retainer 6 as a formed product cannot be removed from the mold device illustrated in FIGS. 13A and 13B because the hook portions 15 impede (interfere with) the mold device.

In this context, a mold device illustrated in FIGS. 10A, 10B, and 10C is set so as to enable even the retainer 6 including the hook portions 15 to be removed from the mold device. FIG. 10A is a sectional view taken along a region for forming the brace portion 6c. FIG. 10B is a sectional view taken along a region for forming the pocket 6d. FIG. 10C is a sectional view taken along a region for forming one of the hook portions 15.

That is, as illustrated in FIG. 11, when "B" represents an outer diameter of the radially-smaller-side ring portion 6b of the retainer (maximum outer diameter of the radially-smaller-side ring portion 6b of the retainer) and "C" represents an inner diameter of each of the hook portions 15, a relationship of B<C is satisfied, and the mold device is formed into a hollow shape so as to eliminate axial interference when a formed product (retainer 6) is removed from the lower die 12. With this, the retainer 6 can be removed.

However, the mold device illustrated in FIGS. 10A, 10B, and 10C is limited to use only for the retainer 6 satisfying the relationship of B<C. Accordingly, limitations are imposed on a design for dimensions of the hook portions 15, and hence it is difficult to adapt the retainer for various designs. That is, in a design in which the retainer has a small angle, and in a design in which the pockets each have a small dimension in the axial direction of the retainer, it is inevitably difficult to establish the relationship of B<C, which may hinder formation of the structure in which the inner diameter of the hook portion and a region to be hooked (hook groove portion) formed on the radially larger side of the inner race are hooked to each other.

It is possible to provide a tapered roller bearing optimum as a bearing for supporting a shaft of a power transmission system of an automobile, and to provide a retainer available for such a bearing. Further, in a method of manufacturing a retainer, stable assembly is possible, and hence the assembly property can be increased.

SUMMARY OF THE INVENTION

In view of the above-mentioned problems, the present invention provides a retainer for a tapered roller bearing, which can be adapted for various designs without imposing limitations on a design for dimensions of the hook portions, a method of manufacturing this retainer, and a tapered roller bearing using this retainer.

According to the present invention, there is provided a retainer for a tapered roller bearing, comprising: a radially-smaller-side ring portion; a radially-larger-side ring portion; a plurality of brace portions arranged between the radially-smaller-side ring portion and the radially-larger-side ring portion; and a hook portion formed on a radially larger side, the hook portion being engaged with a radially larger side of an inner race, the retainer being made of a resin material and retaining tapered rollers in pockets formed between the plurality of brace portions, wherein an end diameter of each of the pockets on a radially smaller side thereof (outer diameter on the ring portion side thereof) is set to be larger than an inner diameter of the hook portion.

According to the retainer for a tapered roller bearing of the present invention, the end diameter of the pocket on the radially smaller side thereof is set to be larger than the inner diameter of the hook portion. This stabilizes the structure in which the inner diameter of the hook portion and a region to be hooked (hook groove) formed on the radially larger side of the inner race are hooked to each other.

It is preferred that the hook portion comprise a radially inner portion of an outer end surface which is formed as a guide inclined surface extending from a radially outer side toward a radially inner side to be inclined to a radially smaller side of the retainer, and that an inclination angle of the guide inclined surface be set to 10° to 30°, and a radial length of the guide inclined surface be set to 20% to 40% of a radial length of the hook portion.

With this setting, at the time of assembly of the tapered roller bearing, the guide inclined surface is brought into slide-contact with the flange portion formed on the radially larger side of the inner race, and thus can prevent butting of the hook portion at the time of assembly. When the inclination angle of the guide inclined surface is smaller than 10°, the guide inclined surface is less likely to exert a guide function because the guide inclined surface has an extremely small inclination angle. Further, when the inclination angle of the guide inclined surface exceeds 30°, strength of the radially inner portion of the hook portion is reduced, with the result that the hook portion is easily damaged. When the length of the guide inclined surface is smaller than 20% of the radial length of the hook portion, the guide inclined surface is less likely to exert the guide function because the guide inclined surface has an extremely small length. Further, when the length of the guide inclined surface exceeds 40% of the radial length of the hook portion, strength of the entire hook portion may be reduced.

It is preferred that the retainer be a retainer formed using a forming mold having a plurality of gates formed therein, a retainer comprising no welded portion on the radially smaller side, and a retainer having a gate mark formed in the radially-smaller-side ring portion. Herein, the gate refers to a gate through which a molten forming material (molten resin) is injected into the cavity in the forming mold. The welded portion refers to a welded line formed on a place where the molten resin interflows, and this welded portion is reduced in strength.

It is preferred that the resin material be PPS as an engineering plastic. Polyphenylene sulfide (PPS) is a high-performance engineering plastic having a molecular structure in which a phenyl group (benzene ring) and sulfur (S) are alternately repeated. PPS is crystalline and is excellent in heat resistance, for example, has a continuous use temperature of 200° C. to 220° C. and has a deflection temperature under load in a high load (1.82 MPa) condition of 260° C. or higher. In addition, PPS has high tensile strength and flexural strength. PPS has a mold shrinkage factor as small as 0.3% to 0.5%, and hence has good dimensional stability. PPS is also excellent in flame retardance and chemical resistance. PPS is broadly classified into three types: a crosslinked type; a linear type; and a semi-crosslinked type. The crosslinked type is a high molecular weight product obtained by crosslinking a low molecular weight polymer and is brittle, and thus, the main grade is a grade reinforced with a glass fiber. The linear type is a high molecular weight product obtained without any cross-linking process at a polymerization stage, and has high toughness. The semi-crosslinked type has a feature of both properties of the crosslinked type and the linear type.

According to the present invention, there is provided a method of manufacturing a retainer for a tapered roller, the retainer comprising: a radially-smaller-side ring portion; a radially-larger-side ring portion; and a plurality of brace portions arranged between the radially-smaller-side ring portion and the radially-larger-side ring portion, the retainer being made of a resin material and retaining tapered rollers in pockets formed between the plurality of brace portions, the method comprising forming the pockets using a slide core which slides toward an axial center of the retainer so as to be inclined with respect to the axial center of the retainer when the retainer is drawn.

According to the method of manufacturing a retainer for a tapered roller of the present invention, after the retainer is formed, the slide core can be slid so as to be inclined with respect to the axial center of the retainer. Accordingly, the retainer can be stably removed from the mold device. Thus, even the retainer, which comprises the hook portion to be engaged with the radially larger side of the inner race, can be removed from the mold device without interference of the hook portion.

A first tapered roller bearing according to the present invention uses the retainer for a tapered roller described above.

A second tapered roller bearing according to the present invention uses a retainer manufactured by the method of manufacturing a retainer for a tapered roller described above.

Each of the tapered roller bearings may comprise a flange portion with which the hook portion is engaged, the flange portion being formed on the radially larger side of the inner race, and a maximum height dimension of the flange portion may be set to 30% or more of a diameter of a larger end surface of each of the tapered rollers.

A roller coefficient γ may be set to exceed 0.94, and an aperture angle formed in a pocket of the retainer may be set to 55° or larger and 80° or smaller. In this case, the roller coefficient γ is defined by the following expression. Further, the aperture angle of the pocket (formed between the brace portions adjacent to each other in the circumferential direction) represents an angle formed between surfaces of the brace portions, which are brought into contact with a rolling surface of each of the tapered rollers.

$$\text{Roller coefficient } \gamma = (Z \cdot DA)/(\pi \cdot PCD)$$

where "Z" represents the number of rollers, "DA" represents an average diameter of rollers, and "PCD" represents a pitch circle diameter of rollers.

It is preferred that the tapered roller bearing of the present invention be used for supporting a power transmission shaft of an automotive vehicle.

The retainer for a tapered roller bearing of the present invention stabilizes the structure in which the inner diameter of the hook portion and a region to be hooked (hook groove portion) formed on the radially larger side of the inner race are hooked to each other. Accordingly, it is possible to increase an assembly property of a tapered roller bearing using the retainer.

When the guide inclined surface is provided, it is possible to prevent butting of the hook portion at the time of assembly of the tapered roller bearing, to attain stable assembly, and to prevent damage to the hook portion due to the butting.

In a case where a retainer is formed using a forming mold having a plurality of gates formed therein, the forming mold has a multi-point gate structure. Accordingly, even in a place where a resin is less likely to flow, a phenomenon in which a resin stagnates (hesitation) is less likely to occur, and hence it is possible to improve flowing characteristics.

Further, in a case of forming a retainer in which a gate mark is formed in the radially-smaller-side ring portion, a resin is poured from the radially smaller side. Accordingly, a molten resin is stably poured into the cavity for forming the radially-smaller-side ring portion, and hence it is possible to form the radially-smaller-side ring portion with high accuracy.

By the way, in a case where the tapered roller bearing of this type is used for a differential, a transmission, or the like, it is assumed that a lubricating oil contains an additive that has high aggressiveness with respect to a resin material. In particular, a lubricating oil used for the differential contains phosphorus and a sulfur component that have high aggressiveness with respect to a resin. Accordingly, as a resin material for the retainer, among engineering plastics, there is adopted polyphenylene sulfide (PPS) which exhibits high resistance against oil, high temperature, and chemicals and is excellent in strength and toughness. As a result, life can be increased significantly.

According to the method of manufacturing a retainer for a tapered roller bearing of the present invention, the mold device comprising the slide core is used, and hence even a retainer, which has such a shape that the hook portion is formed on the radially larger side of the retainer, can be formed without setting a limitation on a dimension of the inner diameter of the hook portion. This can reliably form the hook structure even in a bearing which has any contact angle or any dimensions of pockets in the axial direction of the retainer. Therefore, it is possible to extend the length of each roller, and to increase the load capacity.

The maximum height dimension of the flange portion is set to 30% or more of the diameter of the larger end surface of each of the tapered rollers. Thus, without reducing strength of the flange portion of the inner race, the hook groove into which the hook portion is hooked can be stably formed on the radially larger side of the inner race.

When the roller coefficient γ is set to exceed 0.94, it is possible to increase the load capacity to the same level as that of a full complement roller bearing (bearing without a retainer) without changing a bearing dimension. With this, contact surface pressure can be reduced, and the surface pressure in a halt state can be lessened, which increases fretting resistance.

Further, the aperture angle of the retainer is set to 55° or larger, and hence an excellent contact state can be secured between the retainer and the tapered rollers. The aperture angle of the retainer is set to 80° or smaller, and hence increase in pressing force in the radial direction is prevented, which provides smooth rotation of the tapered rollers.

Thus, the tapered roller bearing of the present invention is optimum as a bearing for supporting a power transmission shaft of an automotive vehicle.

DETAILED DESCRIPTION OF THE INVENTION

In the following, an embodiment of the present invention is described with reference to FIGS. 1 to 8.

Figure 1:
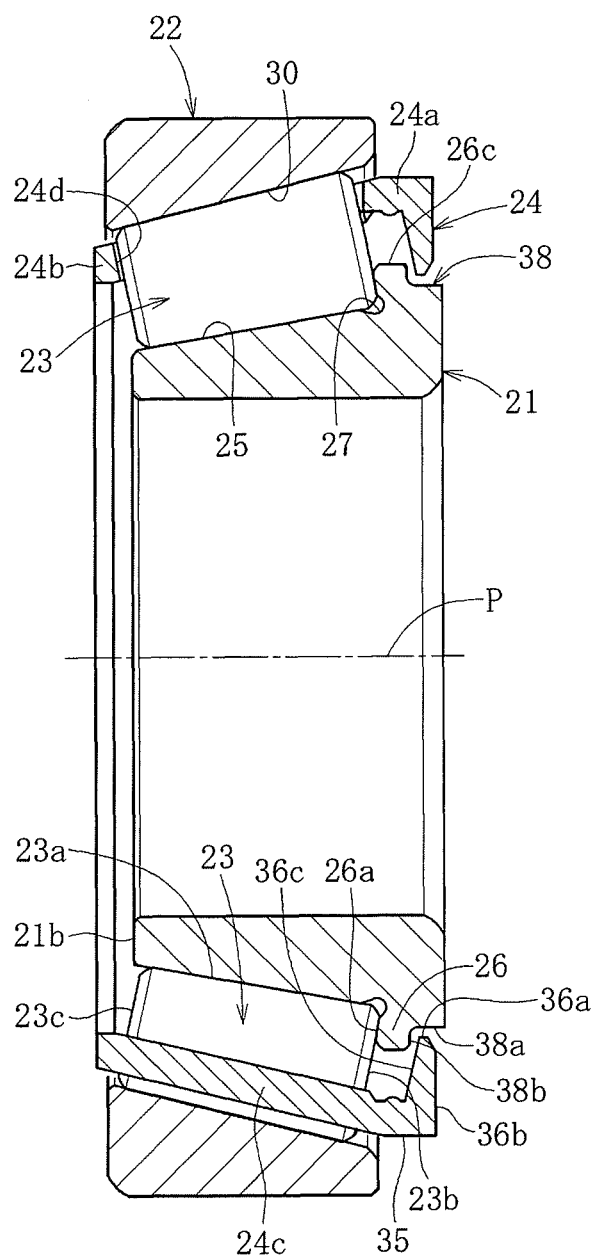
FIG. 1 is a sectional view of a first tapered roller bearing according to the present invention.

FIG. 1 illustrates a tapered roller bearing using a retainer according to the present invention. The tapered roller bearing comprises: an inner race 21; an outer race 22; a plurality of tapered rollers 23 arranged between the inner race 21 and the outer race 22 so as to be rollable; and a retainer 24 made of a resin, for retaining the tapered rollers 23 at predetermined circumferential intervals.

The inner race 21 has a tapered raceway surface 25 formed on a radially outer surface thereof, and a flange portion 26 protruding toward a radially outer side is formed on a radially larger side of the raceway surface 25. That is, the raceway surface 25 is formed in a range from the flange portion 26 to a radially smaller end, and hence the flange portion is not formed on the radially smaller side unlike an inner race of a conventional tapered roller bearing. A grooved portion 27 is formed in a corner portion between the raceway surface 25 and the flange portion 26. The flange portion 26 in this case is a large flange for bearing axial load applied through an intermediation of each of the tapered rollers 23, to thereby guide the rolling of the tapered rollers 23. Note that, a small flange provided in the conventional tapered roller bearing does not play a special role during the rotation of the bearing. In this context, such a component is omitted in the present invention.

Further, an inner surface (i.e., end surface on the radially smaller side) 26a of the flange portion 26 is inclined at a predetermined angle with respect to a plane orthogonal to a bearing axial center P. That is, as illustrated in FIG. 1, in a case where each roller 23 is fitted onto the raceway surface 25 of the inner race 21, in order to bring a peripheral wall 23a of the roller 23 into contact with (abutment on) the raceway surface 25, and to bring a larger end surface 23b of the tapered roller 23 into contact with (abutment on) the inner surface 26a of the flange portion 26, an angle formed by the raceway surface 25 and the inner surface 26a of the flange portion 26 is conformed to an angle formed by the peripheral wall 23a of the roller 23.

The outer race 22 has a tapered raceway surface 30 on a radially inner surface thereof. The plurality of tapered rollers 23 retained by the retainer 24 roll between the raceway surface 30 and the raceway surface 25 of the inner race 21.

Thus, the inner race 21 comprises no flange portion on the radially smaller side thereof. Hence, in the tapered roller bearing, as illustrated in FIG. 1, a smaller end surface 23c of the tapered roller 23 can be extended so as to reach a radially-smaller-side end surface 21b of the inner race 21.

Figure 2:
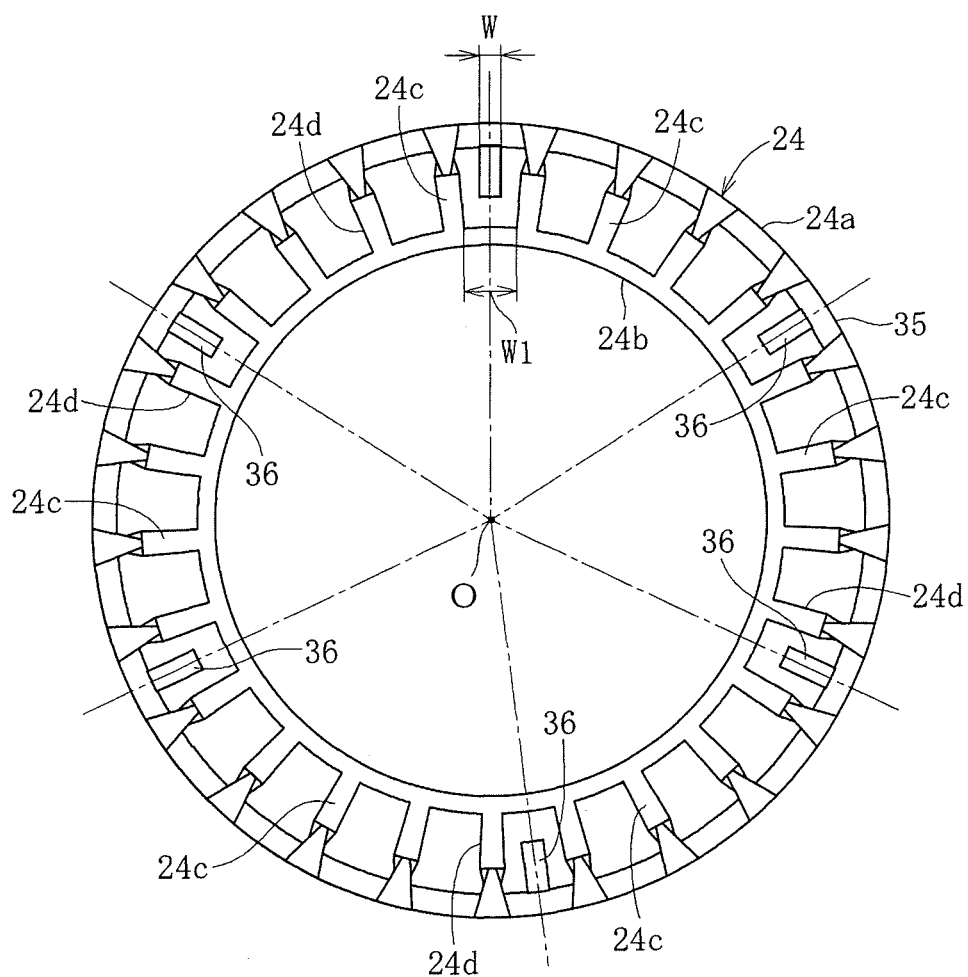
FIG. 2 is a simplified diagram of a retainer used for the tapered roller bearing illustrated in FIG. 1.

Further, as illustrated in FIGS. 1 and 2, the retainer 24 comprises a radially-larger-side ring portion 24a, a radially-smaller-side ring portion 24b, and brace portions 24c extending toward a center O at equiangular positions to couple the ring portions 24a and 24b to each other. Further, the tapered roller 23 is rotatably accommodated in each pocket 24d enclosed by the brace portions 24c and 24c which are adjacent to each other along a circumferential direction.

The radially-larger-side annular portion (radially-larger-side ring portion) 24a comprises a short cylindrical portion 35 having a large diameter, and hook portions 36 arranged at pitches of 60 degrees along the circumferential direction. As illustrated in FIG. 2, when viewed along an axial direction, each of the hook portions 36 has such a size as to be accommodated in one corresponding pocket 24d.

Further, a cutout portion 38 is formed on a radially larger side of an outer peripheral surface 26c of the flange portion 26 of the inner race 21, and the hook portions 36 are engaged with the cutout portion 38 in a loosely fitted manner. That is, under a state in which the hook portions 36 are engaged with the cutout portion 38, a gap is formed between a radially inner end 36a of each of the hook portions 36 and a cutout surface (axial cutout surface) 38a of the cutout portion 38, and between an inner end surface 36c of each of the hook portions 36 on the radially inner end 36a side thereof and a cutout surface (radial cutout surface) 38b of the cutout portion 38.

Figure 3:
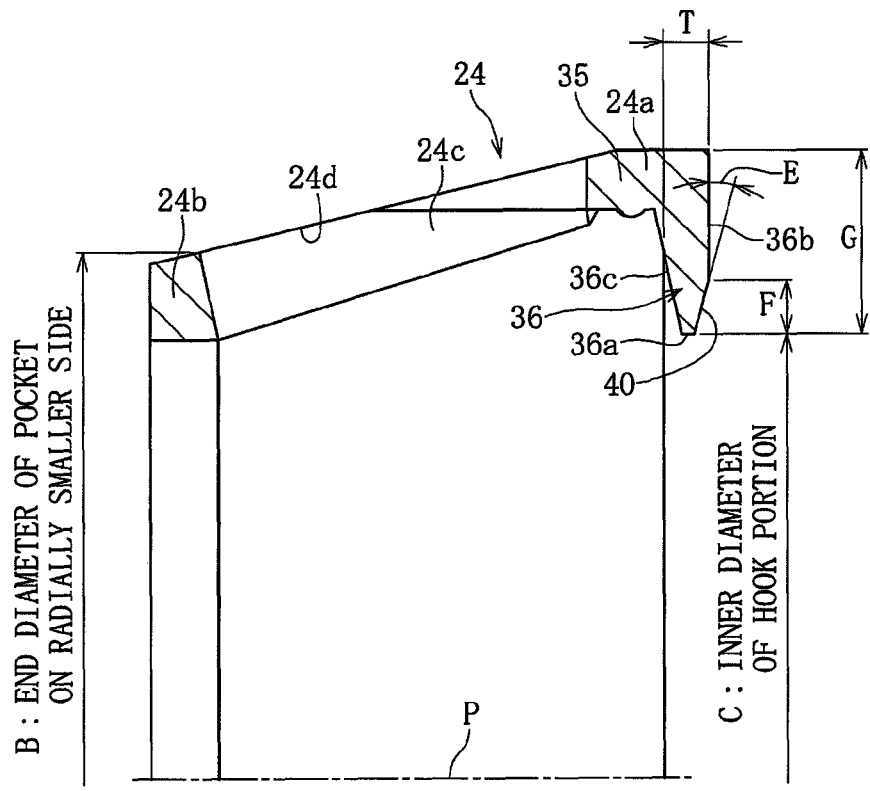
FIG. 3 is an enlarged sectional view of a main part of the retainer illustrated in FIG. 2.

Further, as illustrated in FIG. 3, a radially inner portion of an outer end surface of the hook portion 36 is formed as a guide inclined surface 40 extending from the radially outer side toward the radially inner side to be inclined to the radially smaller side. In this case, an inclination angle E of the guide inclined surface 40 is set to, for example, 10° to 30°. Further, a radial length F of the guide inclined surface 40 is set to 20% to 40% of a radial length G of the hook portion 36. Note that, an outer end surface 36b of the hook portion 36 is arranged on a plane orthogonal to the bearing axial center P, and the inner end surface 36c of the hook portion 36 is inclined at a predetermined angle with respect to the plane orthogonal to the bearing axial center P. That is, the inner end surface 36c of the hook portion 36 and the inner surface 26a of the flange portion 26 are arranged in parallel to each other.

Further, when "B" represents an outer diameter of the pocket on the radially-smaller-side ring portion 24b side thereof (end diameter of the pocket 24d on the radially smaller side thereof) and "C" represents an inner diameter of the hook portion 36, a relationship of B>C is satisfied. The inner diameter of the hook portion 36 is twice a dimension extending from the radially inner end 36a of the hook portion 36 to the bearing axial center P.

The retainer 24 is made of a resin, and it is preferred to use engineering plastics as the resin. The engineering plastics herein refer to a synthetic resin excellent mainly in thermal resistance and usable in fields in which strength is required, and are abbreviated as "enpla". Further, the engineering plastics include general-purpose engineering plastics and super engineering plastics, both of which may be used for forming the retainer 24. Typical examples of the engineering plastics include the following. Note that, the following are mere examples of the engineering plastics, and hence the engineering plastics are not limited thereto.

Examples of the general-purpose engineering plastics include polycarbonate (PC), polyamide 6 (PA6), polyamide 66 (PA66), polyacetal (POM), modified polyphenylene ether (m-PPE), polybutylene terephthalate (PBT), GF-reinforced polyethylene terephthalate (GF-PET), and ultra high molecular weight polyethylene (UHMW-PE). Further, examples of the super engineering plastics include polysulfone (PSF), polyether sulfone (PES), polyphenylene sulfide (PPS), polyarylate (PAR), polyamideimide (PAI), polyetherimide (PEI), polyetheretherketone (PEEK), liquid crystal polymer (LCP), thermoplastic polyimide (TPI), polybenzimidazole (PBI), polymethylpentene (TPX), poly(1,4-cyclohexanedimethylene terephthalate) (PCT), polyamide 46 (PA46), polyamide 6T (PA6T), polyamide 9T (PA9T), polyamide 11, 12 (PA11, 12), fluororesins, and polyphthalamide (PPA).

Particularly preferred is a polyphenylene sulfide (PPS) resin. PPS is a high-performance engineering plastic having a molecular structure in which a phenyl group (benzene ring) and sulfur (S) are alternately repeated. PPS is crystalline and is excellent in heat resistance, for example, has a continuous use temperature of 200° C. to 220° C. and has a deflection temperature under load in a high load (1.82 MPa) condition of 260° C. or higher. In addition, PPS has high tensile strength and flexural strength. PPS has a mold shrinkage factor as small as 0.3% to 0.5%, and hence has good dimensional stability. PPS is also excellent in flame retardance and chemical resistance. PPS is broadly classified into three types: a crosslinked type; a linear type; and a semi-crosslinked type. The crosslinked type is a high molecular weight product obtained by crosslinking a low molecular weight polymer and is brittle, and thus is reinforced with a glass fiber. The linear type is a high molecular weight product obtained without any cross-linking process at a polymerization stage, and has high toughness. The semi-crosslinked type has a feature of both properties of the crosslinked type and the linear type.

Figure 5:
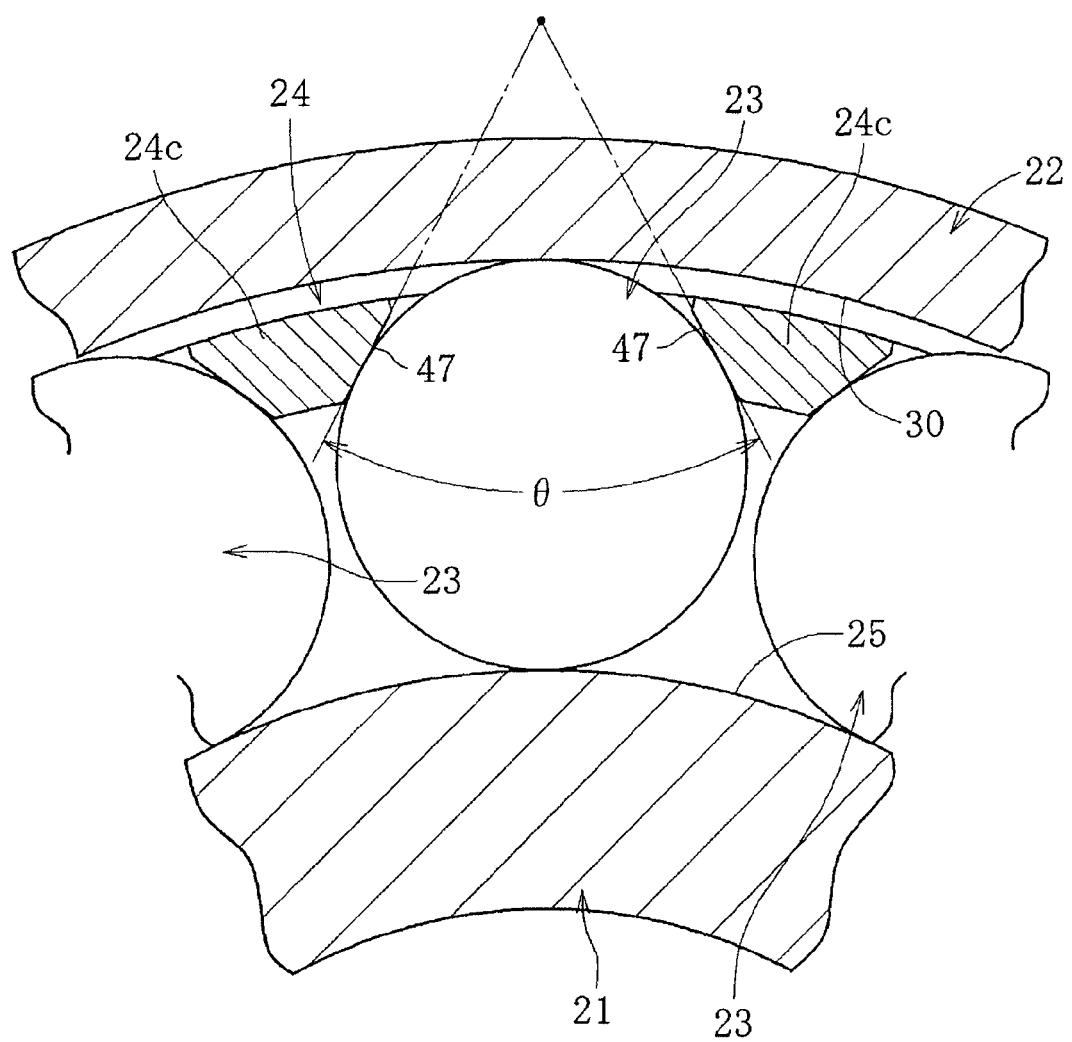
FIG. 5 is a sectional view illustrating an aperture angle formed in a pocket of the retainer.

In the retainer 24, as illustrated in FIG. 5, and in the retainer 24, an aperture pressing-angle (aperture angle) θ (see FIG. 2) formed between brace surfaces 47 of the brace portions 24c adjacent to each other is set to, for example, 55° or larger and 80° or smaller.

A roller coefficient γ is set to exceed 0.94. In this case, the roller coefficient γ is defined by the following expression. Further, the aperture angle θ of the pocket (formed between the brace portions adjacent to each other in the circumferential direction) represents an angle formed between surfaces of the brace portions 24c, which are brought into contact with a rolling surface of each of the tapered rollers 23.

$$\text{Roller coefficient } \gamma=(Z\cdot DA)/(\pi\cdot PCD)$$

where "Z" represents the number of rollers, "DA" represents an average diameter of rollers, and "PCD" represents a pitch circle diameter of rollers.

Figure 4:
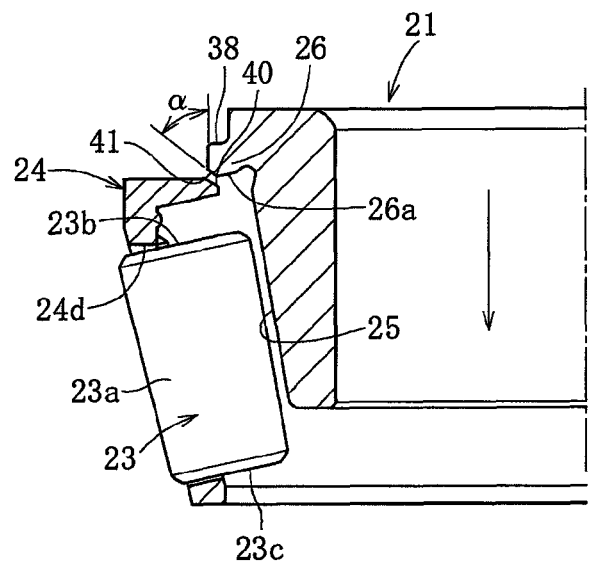
FIG. 4 is a sectional view illustrating an assembled state of the tapered roller bearing using the retainer illustrated in FIG. 2.

Next, description is made of an assembly method for the tapered roller bearing. First, as illustrated in FIG. 4, the rollers 23 are accommodated in the pockets 24d of the retainer 24, respectively. Then, the inner race 21 is pushed onto an inner periphery of the retainer 24, and the outer race 22 is fitted onto an outer periphery of each roller 23 while being pushed thereonto in the axial direction. The hook portions 36 of the retainer 24 are elastically deformed, and thus can be engaged with the cutout portion 38. At this time, a slight gap is formed between each of the hook portions 36 and the cutout portion 38 in the axial direction and the radial direction. This enables the retainer 24 to move slightly in the axial direction and the radial direction.

Until completion of incorporation of the tapered roller bearing into a machine, the rollers 23 are likely to fall to a smaller end side due to their own weights. Along with this, a pressing force in the same direction as the falling direction of the rollers 23 acts also on the retainer 24. Accordingly, from a larger end side, the hook portions 36 are engaged with the cutout portion 38 formed in the inner race 21, and hence further displacement of the retainer 24 to the smaller end side is restricted. In this case, displacement of each of the rollers 23 to the smaller end side is restricted by a radially inner edge of the pocket 24d, and hence it is possible to prevent the rollers 23 from falling off from the inner race 21.

By the way, in a case where the inner race 21 is pushed onto the inner periphery of the retainer 24, the guide inclined surface 40 of the hook portion 36 is brought into slide-contact with the inner surface 26a of the flange portion 26. Therefore, it is preferred that a cutout surface 41 (see FIG. 4) be formed on a radially outer portion of the inner surface 26a. Thus, the guide inclined surface 40 is brought into slide-contact with the cutout surface 41, and hence it is possible to assemble the retainer 24 and the inner race 21 to each other without causing the hook portion 36 to butt against the flange portion 26. Note that, the guide inclined surface 40 is formed in the hook portion 36. Hence, even in a case where the inner race 21 does not comprise the cutout surface 41, it is possible to assemble the retainer 24 and the inner race 21 to each other without causing the hook portion 36 to butt against the flange portion 26.

According to the retainer for a tapered roller bearing of the present invention, the end diameter of the pocket 24d on the radially smaller side thereof is set to be larger than the inner diameter of the hook portion 36. This stabilizes the structure in which the inner diameter of the hook portion 36 and a flange portion 26 formed on the radially larger side of the inner race 21 are hooked to each other. Accordingly, it is possible to increase an assembly property of a tapered roller bearing using the retainer 24.

When the guide inclined surface 40 is provided, it is possible to prevent butting of the hook portion 36 at the time of assembly of the tapered roller bearing, to attain stable assembly, and to prevent damage to the hook portion 36 due to the butting. When the inclination angle of the guide inclined surface 40 is smaller than 10°, the guide inclined surface 40 is less likely to exert a guide function because the guide inclined surface 40 has an extremely small inclination angle. Further, when the inclination angle of the guide inclined surface 40 exceeds 30°, strength of the radially inner portion of the hook portion is reduced, with the result that the hook portion is easily damaged. When the length of the guide inclined surface 40 is smaller than 20% of the radial length of the hook portion, the guide inclined surface 40 is less likely to exert the guide function because the guide inclined surface 40 has an extremely small length. Further, when the length of the guide inclined surface 40 exceeds 40% of the radial length of the hook portion, strength of the entire hook portion may be reduced.

When the roller coefficient γ is set to exceed 0.94, it is possible to increase load capacity to the same level as that of a full complement roller bearing (bearing without a retainer) without changing a bearing dimension. With this, contact surface pressure can be reduced, and the surface pressure can be lessened in a case where the tapered roller bearing is applied to an application having a halt state in a use cycle, which increases fretting resistance.

Further, the aperture angle θ of the retainer 24 is set to 55° or larger, and hence an excellent contact state can be secured between the retainer 24 and the tapered rollers 23. The aperture angle θ of the retainer 24 is set to 80° or smaller, and hence increase in pressing force in the radial direction is prevented, which provides smooth rotation of the tapered rollers.

Figure 6A:
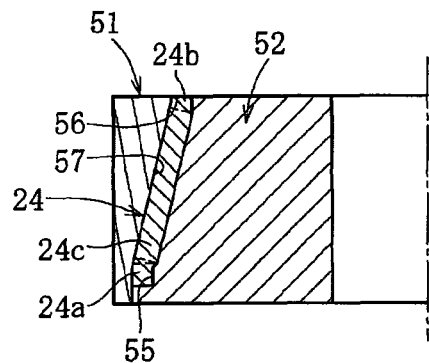
FIG. 6A is a sectional view of a mold device taken along a region for forming a brace portion, the mold device being used to manufacture the retainer illustrated in FIG. 2.
Figure 6B:
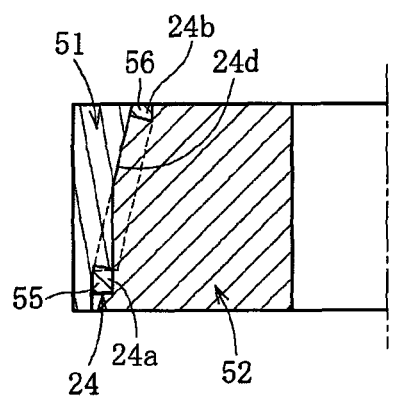
FIG. 6B is a sectional view of the mold device taken along a region for forming a pocket, the mold device being used to manufacture the retainer illustrated in FIG. 2.
Figure 6C:
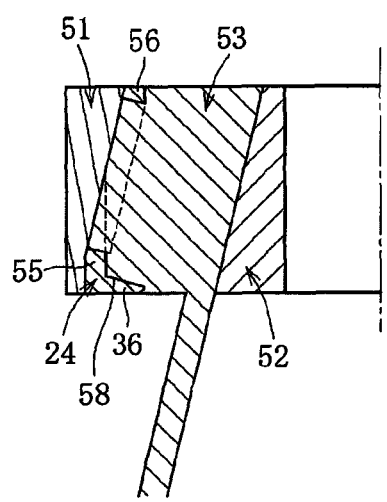
FIG. 6C is a sectional view of the mold device taken along a region for forming a hook portion, the mold device being used to manufacture the retainer illustrated in FIG. 2.

Next, a method of manufacturing the retainer 24 is described. In this case, a mold device illustrated in FIGS. 6A, 6B, and 6C is used. The mold device comprises a first die 51 arranged on the radially outer side, a second die 52 arranged on the radially inner side, and a slide core 53 for forming the pockets 24d each having the hook portion 36.

That is, FIG. 6A is a sectional view taken along a region for forming the brace portion 24c, FIG. 6B is a sectional view taken along a region for forming the pocket 24d, and FIG. 6C is a sectional view taken along a region for forming the hook portion 36. That is, the first die 51, the second die 52, and the slide core 53 are combined together, to thereby form a cavity 55 for forming the ring portion 24a, a cavity 56 for forming the ring portion 24b, a cavity 57 for forming the brace portions 24c, and a cavity 58 for forming the hook portions 36.

Therefore, as illustrated in FIGS. 6A, 6B, and 6C, under a state in which the first die 51, the second die 52, and the slide core 53 are combined together, a resin material is filled into the formed cavities 55, 56, 57, and 58, and then is pressurized. In this manner, it is possible to form the retainer 24 illustrated in FIG. 3 and the like. Note that, the cavities 56 and 58 are open in the illustrated example, but the mold device according to the embodiment of the present invention is provided with a die for closing the cavities 56 and 58.

Figure 7:
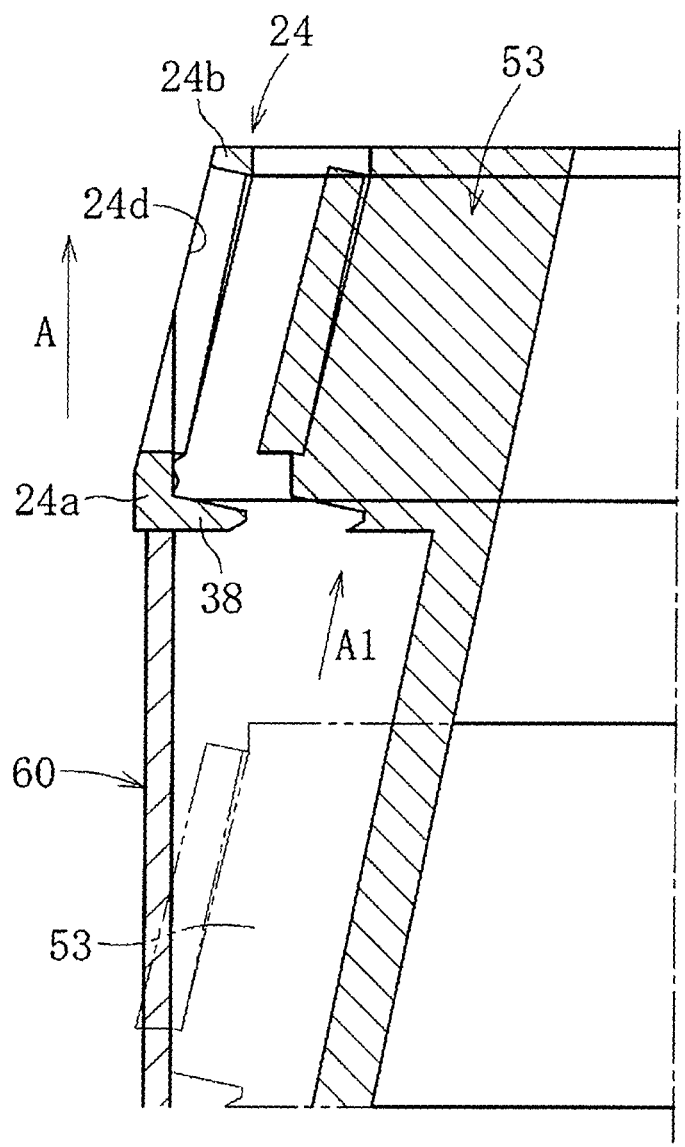
FIG. 7 is a sectional view illustrating a method of removing the retainer from the mold device illustrated in FIG. 6.

Thus, after forming a product (retainer 24), the product is removed from the mold device. Similarly to a case of a conventional mold device, this removal is performed in such a manner that the first die 51 is slid with respect to the second die 52 to the radially smaller side toward the axial center. In this case, the above-mentioned die (not shown) is separated from the first die 51, the second die 52, and the slide core 53. Then, as illustrated in FIG. 7, using a lifting jig 60, the product (retainer 24) is lifted toward the axial center of the retainer along an arrow "A" direction. At this time, the slide core 53 is also lifted, and the slide core 53 is lifted toward the axial center of the retainer so as to slide along an arrow "A1" direction that is inclined with respect to the axial center of the retainer.

Accordingly, as the slide core 53 is lifted, the slide core 53 is moved away from the product (retainer 24) radially inward. Therefore, without causing the hook portions 36 to butt against the second die 52 and the slide core 53, the product (retainer 24) can be removed from the mold device.

The retainer 24 is formed using an injection molding machine. Description is made of a general method of forming a product using the injection molding machine. First, a plastic material (granules) is fed into a hopper by a loader. A raw material, which flows from the hopper into an inlet of a heated barrel, is sent into the heated barrel through rotation of a screw. The heated barrel is controlled in temperature by an electric heater which is provided around the heated barrel, and the material is melted by heat of the heater and frictional heat generated through rotation and shear. The screw retreats while sending a molten material into the heated barrel. When a certain amount of the molten material is accumulated in a tip of the screw in the heated barrel, the screw stops rotating. After a forming mold is closed and fastened, the screw is caused to advance, and the molten material is pressurized to be injected into the mold device (mold).

In the mold, the molten material flows through a sprue, a runner, and a gate in the stated order, and then flows into a space (cavity) for a product to be formed. At this time, the air within the cavity is discharged to the outside through a gas vent, and the air is substituted by the molten material. The mold is maintained at a relatively low temperature in order to accelerate a flow of the molten material and to cool and solidify the molten material. After the molten material is solidified, the mold is opened to be divided into a female die (cavity side) and a male die (core side), and the formed product generally remaining on the core is removed.

By the way, in a case where the retainer 24 is formed, the gate is open to a space (cavity) for forming the radially-smaller-side ring portion 24b, and the gate comprises a plurality of gates. In a case where the retainer is formed using a forming mold having a plurality of gates formed therein, the forming mold has a multi-point gate structure. Accordingly, even in a place where a resin is less likely to flow, a phenomenon in which a resin stagnates (hesitation) is less likely to occur, and hence it is possible to improve flowing characteristics. It is preferred that the number of gates be about three to five. When the number of gates is smaller than three, injection pressure is high. When the number of gates exceeds five, mold structure is complicated, which leads to increase in cost.

Further, in a case of forming a retainer in which a gate mark is formed in the radially-smaller-side ring portion 24b, a resin is poured from the radially smaller side. Accordingly, a molten resin is stably poured into the cavity 56 for forming the radially-smaller-side ring portion, and hence it is possible to form the radially-smaller-side ring portion 24b with high accuracy.

The radially-smaller-side ring portion 24b has a small thickness dimension, and hence a resin flowing in a part for forming the radially-smaller-side ring portion 24b is less likely to flow at the time of forming. Therefore, it is expected that, at the radially-smaller-side ring portion 24b, the resin flowing in this part is welded to a resin flowing from the radially larger side (a welded portion is generated). In particular, in a case of using a resin filled with a resin reinforcement, flowability is degraded as a filling amount of the resin reinforcement increases. The welded portion is inferior in strength, and hence an early damage starting from the welded portion may occur.

Accordingly, with use of a resin material which is less likely to stagnate even in the cavity for forming the radially-smaller-side ring portion, it is possible to prevent generation of the welded portion at the radially-smaller-side ring portion, and to provide a retainer in which no welded portion is generated on the radially smaller side. This can prevent an early damage resulting from the welded portion of the retainer.

Figure 8:
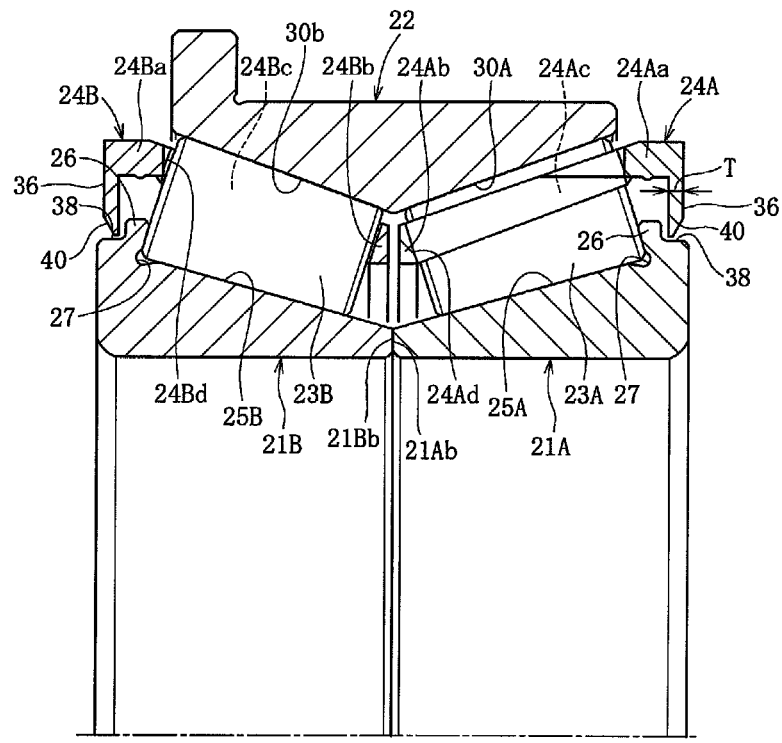
FIG. 8 is a sectional view of a second tapered roller bearing according to the present invention.
Figure 9:
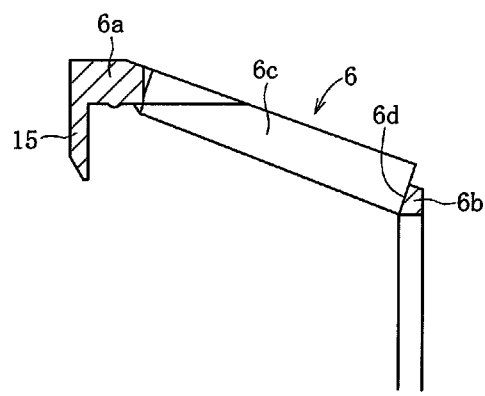
FIG. 9 is a sectional view of a conventional retainer for a tapered roller bearing.
Figure 10A:
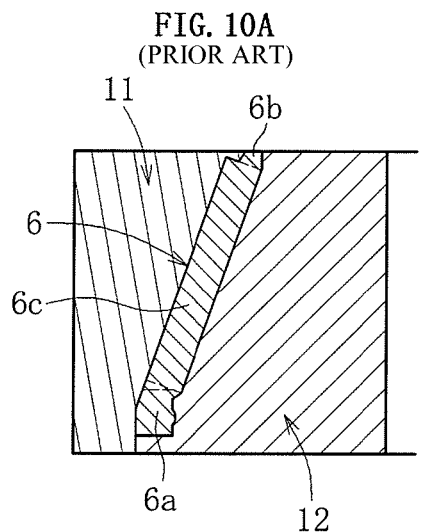
FIG. 10A is a sectional view of a mold device taken along a region for forming a brace portion, the mold device being used to manufacture the retainer for a tapered roller bearing illustrated in FIG. 9.
Figure 10B:
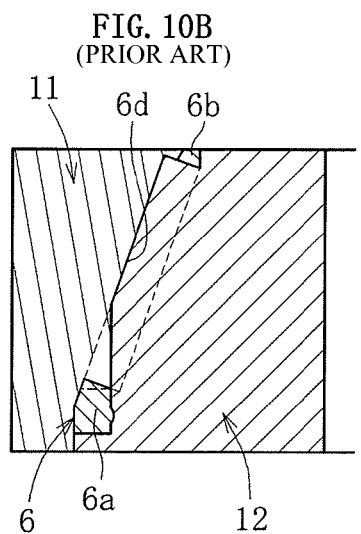
FIG. 10B is a sectional view of the mold device taken along a region for forming a pocket, the mold device being used to manufacture the retainer for a tapered roller bearing illustrated in FIG. 9.
Figure 10C:
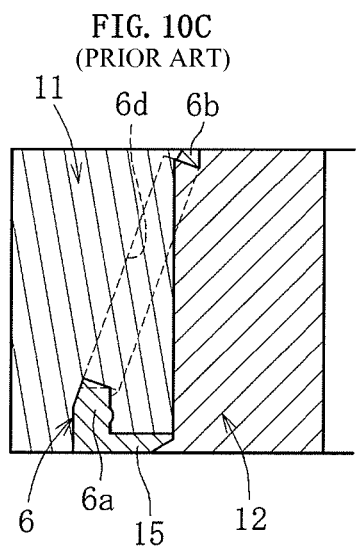
FIG. 10C is a sectional view of the mold device taken along a region for forming a hook portion, the mold device being used to manufacture the retainer for a tapered roller bearing illustrated in FIG. 9.
Figure 11:
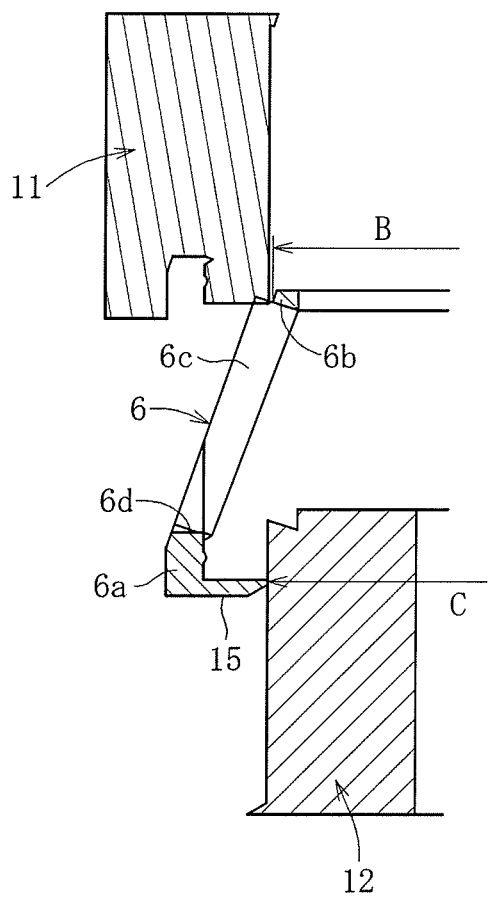
FIG. 11 is a sectional view illustrating a method of removing the retainer from the mold device illustrated in FIGS. 10A to 10C.
Figure 12:
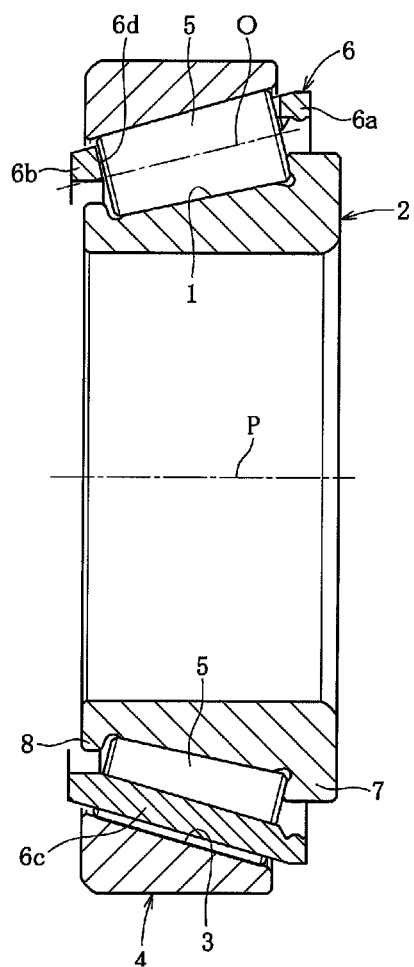
FIG. 12 is a sectional view of a conventional tapered roller bearing.
Figure 13A:
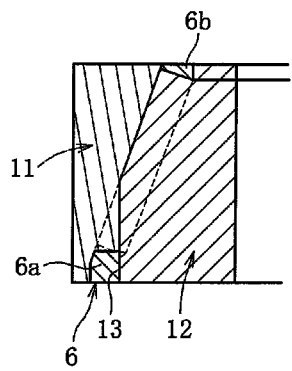
FIG. 13A is a sectional view illustrating a mold device for a retainer used for the tapered roller bearing illustrated in FIG. 12, and illustrating a state in which the retainer is formed.
Figure 13B:
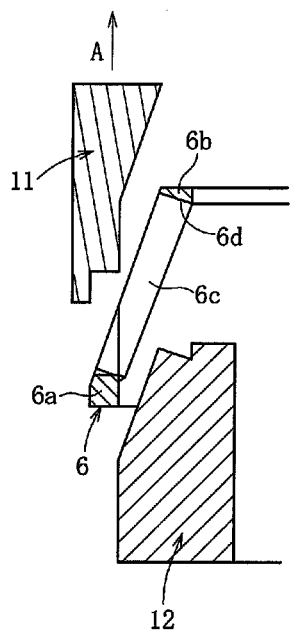
FIG. 13B is a sectional view illustrating the mold device for the retainer used for the tapered roller bearing illustrated in FIG. 12, and illustrating a state in which the retainer is removed.

Next, FIG. 8 illustrates a tapered roller bearing comprising: a pair of inner races 21A and 21B; an outer race 22; a plurality of tapered rollers 23A; a plurality of tapered rollers 23B; a retainer 24A; and a retainer 24B. The inner race 21A has a raceway surface 25A on a radially outer surface thereof, and the inner race 21B has a raceway surface 25B on a radially outer surface thereof. The outer race 22 has tapered raceway surfaces 30A, 30B on an inner periphery thereof. The plurality of tapered rollers 23A are interposed between the raceway surface 25A of the inner race 21A and the raceway surface 30A of the outer race 22, and the plurality of tapered rollers 23B are interposed between the raceway surface 25B of the inner race 21B and the raceway surface 30B of the outer race 22. The retainer 24A retains the plurality of tapered rollers 23A at equal intervals in the circumferential direction, and the retainer 24B retains the plurality of tapered rollers 23B at equal intervals in the circumferential direction.

The retainer 24A comprises a pair of annular portions (ring portions) 24Aa and 24Ab, and brace portions 24Ac extending toward the roller center O at equiangular positions to couple the ring portions 24Aa and 24Ab to each other, and the retainer 24B comprises a pair of annular portions (ring portions) 24Ba and 24Bb, and brace portions 24Bc extending toward the roller center O at equiangular positions to couple the ring portions 24Ba and 24Bb to each other. Further, the tapered roller 23A is rotatably accommodated in each pocket 24Ad enclosed by the brace portions 24Ac adjacent to each other along the circumferential direction, and the tapered roller 23B is rotatably accommodated in each pocket 24Bd enclosed by the brace portions 24Bc adjacent to each other along the circumferential direction.

Similarly to the inner race 21 illustrated in FIG. 1, each of the inner races 21A and 21B comprises an annular flange portion (large flange) 26 formed on a larger end side of an outer periphery thereof. Further, the cutout portion 38 is formed in the annular flange portion 26, and the above-mentioned hook portions 36 are engaged with the cutout portion 38 in a loosely fitted manner. The pair of inner races 21A and 21B is arranged in such a manner that a radially-smaller-side end surface 21Ab of the inner race 21A and a radially-smaller-side end surface 21Bb of the inner race 21B abut on each other.

Also in this case, the end diameter B of each of the pockets 24Ad and 24Bd on the radially smaller side thereof is set to be larger than the inner diameter C of the hook portion 36, and the radially inner portion of the outer end surface of the hook portion 36 is formed as the guide inclined surface 40 extending from the radially outer side toward the radially inner side to be inclined to the radially smaller side. Further, the inclination angle of the guide inclined surface 40 is set to 10° to 30°, and the radial length of the guide inclined surface is set to 20% of the radial length of the hook portion. In addition, the aperture pressing-angle (aperture angle) θ is set to 55° or larger and 80° or smaller, and the roller coefficient γ is set to exceed 0.94.

Accordingly, the tapered roller bearing and the retainers 24A and 24B illustrated in FIG. 8 provide the same operations and effects as those illustrated in FIG. 1. Further, each of the retainers 24A and 24B is also manufactured using the mold device which is illustrated in FIGS. 6A to 6C and FIG. 7 and comprises the slide core. Thus, it is possible to stably manufacture a retainer comprising the hook portions 36 satisfying the relationship of B>C.

Hereinabove, description has been made of the embodiment of the present invention. In this context, the present invention is not limited to the above-mentioned embodiment, and various modifications may be made thereto. For example, the number of the hook portions 36 formed in the retainer is arbitrary, but there need to be provided as many hook portions 36 as to prevent the rollers 23 from falling off when assembled. In the retainers 24A and 24B illustrated in FIG. 8, unlike the hook portions 36 illustrated in FIG. 3 and the like, the inner end surface 36c of each of the hook portions 36 is formed on a plane orthogonal to the axial center P, but may be inclined in the same way as that of the hook portions 36 illustrated in FIG. 3 and the like. Further, on the contrary, similarly to the hook portions 36 of each of the retainers 24A and 24B illustrated in FIG. 8, the inner end surface 36c of each of the hook portions 36 illustrated in FIG. 3 and the like may have no inclination. It is possible to variously set a width dimension W of each of the hook portions 36 (see FIG. 2) within a range smaller than a width dimension W1 of the pocket 24d in which each of the hook portions 36 is arranged (see FIG. 2), and within such a range that the hook portions 36 are not inferior in strength and prevent the rollers 23 from falling off. Further, it is possible to variously set a thickness of each of the hook portions 36 within such a range that the hook portions 36 are not inferior in strength and prevent the rollers 23 from falling off.

An assembly property of a guide inclined surface of a hook portion was examined. The examination results are shown in Tables 1 to 3 below.

TABLE 1

| Angle of guide surface (E) | 10° to 30° | | |
|---|---|---|---|
| Radial dimension of guide surface (F) (% relative to radial length G) | 20% to 40% | 40% to 60% | 60% to 80% |
| | ○ (Five out of five were OK) | Δ (Two out of five were broken) | x (Five out of five were broken) |

TABLE 2

| Angle of guide surface (E) | 30° to 60° | | |
|---|---|---|---|
| Radial dimension of guide surface (F) (% relative to radial length G) | 20% to 40% | 40% to 60% | 60% to 80% |
| | x (Five out of five were broken) | x (Five out of five were broken) | x (Five out of five were broken) |

TABLE 3

| Angle of guide surface (E) | 60° to 90° | | |
|---|---|---|---|
| Radial dimension of guide surface (F) (% relative to radial length G) | 20% to 40% | 40% to 60% | 60% to 80% |
| | x (Five out of five were broken) | x (Five out of five were broken) | x (Five out of five were broken) |

There was used an inner race in which a cutout (chamfer) was formed in a flange portion, and a chamfer angle (α) of the cutout (see FIG. 4) was set to 75°. Further, the retainer having the shape illustrated in FIG. 2 was used as a retainer, and PPS was used as a resin material. A width dimension W of the retainer was set to 4.0 mm, and a thickness T (average thickness) thereof was set to 0.8 mm (see FIG. 3).

For examination, damage states were examined regarding a retainer having an inclination angle E of 10° or larger and 30° or smaller, a retainer having an inclination angle E of larger than 30° and 60° or smaller (shown as 30° to 60° in the tables), and a retainer having an inclination angle E of larger than 60° and 90° or smaller (shown as 60° to 90° in the tables). In this case, in the retainer having the inclination angle E of 10° or larger and 30° or smaller, a radial length of the guide inclined surface was set to 20% or more and 40% or less of a radial length of the hook portion, set to more than 40% and 60% or less (shown as 40° to 60° in the tables), or set to more than 60% and 90% or less (shown as 60° to 90° in the tables).

As is apparent from the results, despite a relation to the chamfer formed in the flange portion 26 of the inner race 21, the retainer having the following structure is stable in terms of strength and can be assembled without butting. Specifically, the retainer has such structure that the inclination angle of the guide inclined surface 40 is set to 10° to 30° and the radial length of the guide inclined surface 40 is set to 20% to 40% of the radial length of the hook portion 36. Even in a case where the inclination angle of the guide inclined surface 40 is set to 10° to 30°, when a radial dimension of the guide inclined surface 40 is increased, a thickness thereof is reduced, which causes damage due to reduction in strength.

The invention claimed is:

1. A retainer for a tapered roller bearing, comprising:
   a first side having a first radius and a second side having a second radius, wherein the first radius is smaller than the second radius;
   a first ring portion at the first side of the retainer;
   a second ring portion at the second side of the retainer;
   a plurality of brace portions arranged between the first ring portion and the second ring portion; and
   a hook portion formed at the second side of the retainer, the hook portion being engaged with a second side of an inner race, the second side of the inner race having a radius that is larger than a radius of a first side of the inner race;
   wherein the retainer is made of a resin material and is configured to retain tapered rollers in pockets formed between the plurality of brace portions,
   wherein an outer diameter of each of the pockets at the first side of the retainer is larger than an inner diameter of the hook portion,
   wherein the hook portion comprises an outer end surface, a radially inner end, and a guide inclined surface extending from the outer end surface to the radially inner end so as to incline toward the first side of the retainer, and
   wherein an inclination angle of the guide inclined surface with respect to the outer end surface is within a range from 10° to 30°, and a radial length of the guide inclined surface is within a range from 20% to 40% of a radial length of the hook portion.

2. A retainer for a tapered roller bearing according to claim 1, wherein the retainer is formed using a forming mold having a plurality of gates formed therein.

3. A retainer for a tapered roller bearing according to claim 1, wherein the first ring portion does not comprise a welded portion.

4. A retainer for a tapered roller bearing according to claim 1, wherein the resin material comprises PPS as an engineering plastic.

5. A tapered roller bearing comprising the retainer for a tapered roller bearing according to claim 1.

6. A tapered roller bearing comprising the retainer for a tapered roller bearing according to claim 1, and supporting a power transmission shaft of an automotive vehicle.

* * * * *